(12) United States Patent
Guerrero Gutierrez et al.

(10) Patent No.: US 10,429,122 B2
(45) Date of Patent: Oct. 1, 2019

(54) METHOD AND APPARATUS FOR ENHANCED OFF-CYCLE DEFROST

(71) Applicant: KYSOR WARREN EPTA US CORPORATION, Columbus, GA (US)

(72) Inventors: Jose Ramon Guerrero Gutierrez, Ellerslie, GA (US); Chandrashekhara Chikkakalbalu, Columbus, GA (US)

(73) Assignee: Kysor Warren EPTA US Corporation, Columbus, GA (US)

( * ) Notice: Subject to any disclaimer, the term of this patent is extended or adjusted under 35 U.S.C. 154(b) by 0 days.

(21) Appl. No.: 15/660,144

(22) Filed: Jul. 26, 2017

(65) Prior Publication Data

US 2018/0209717 A1    Jul. 26, 2018

Related U.S. Application Data

(60) Provisional application No. 62/449,694, filed on Jan. 24, 2017.

(51) Int. Cl.
| | |
|---|---|
| *F25D 21/06* | (2006.01) |
| *F25D 21/00* | (2006.01) |
| *A47F 3/04* | (2006.01) |

(52) U.S. Cl.
CPC ............ *F25D 21/06* (2013.01); *A47F 3/0408* (2013.01); *A47F 3/0478* (2013.01); *F25D 21/006* (2013.01); *F25B 2600/112* (2013.01); *Y02B 30/743* (2013.01)

(58) Field of Classification Search
CPC .. F25B 2600/112; F25D 21/06; F25D 21/006; F25D 2700/02
See application file for complete search history.

(56) References Cited

U.S. PATENT DOCUMENTS

| | | | |
|---|---|---|---|
| 3,877,243 A | 4/1975 | Kramer | |
| 4,302,946 A * | 12/1981 | Ibrahim | A47F 3/0447 |
| | | | 62/234 |
| 4,328,680 A | 5/1982 | Stamp, Jr. et al. | |
| 6,070,419 A * | 6/2000 | Chang | F24F 9/00 |
| | | | 62/408 |

(Continued)

FOREIGN PATENT DOCUMENTS

| | | |
|---|---|---|
| EP | 2505946 A1 | 10/2012 |
| EP | 2853844 A1 | 4/2015 |
| WO | WO-2007/136374 A1 | 11/2007 |

*Primary Examiner* — Jonathan Bradford
(74) *Attorney, Agent, or Firm* — Meunier Carlin & Curfman LLC

(57) ABSTRACT

A refrigeration system includes a first circulation fan electrically coupled to a power source via a first load wire. A relay is electrically coupled to the first circulation fan via a second load wire and to the power source. In an open position, the relay interrupts electrical voltage from the relay to the first circulation fan via the second load wire causing the first circulation fan to operate in a low-speed mode. In a closed position, the relay supplies electrical voltage to the first circulation fan via the second load wire causing the first circulation fan to operate in a high-speed mode. Operation of the first circulation fan in the high-speed mode reduces a defrost cycle time associated with the refrigeration system relative to operation of the first circulation fan in low-speed mode.

16 Claims, 6 Drawing Sheets

(56) References Cited

U.S. PATENT DOCUMENTS

| | | | | |
|---|---|---|---|---|
| 6,105,377 A | * | 8/2000 | Jeong | F25D 29/00 62/180 |
| 7,131,546 B1 | * | 11/2006 | Price | A47F 5/00 211/86.01 |
| 2001/0039927 A1 | * | 11/2001 | Oishi | F01P 7/048 123/41.12 |

* cited by examiner

METHOD AND APPARATUS FOR ENHANCED OFF-CYCLE DEFROST

CROSS-REFERENCE TO RELATED APPLICATIONS

This patent application claims priority to, and incorporates by reference for any purpose the entire disclosure of U.S. provisional Patent Application No. 62/449,694, filed on Jan. 24, 2017.

TECHNICAL FIELD

The present disclosure relates generally to refrigerated display cases and more particularly, but not by way of limitation, to refrigerated display cases utilizing a dual-speed fan enabling reduced defrost cycle time.

BACKGROUND

Refrigerated display cases are commonly utilized in a variety of industries and typically include at least one fan that circulates cooled air through the refrigerated display case. In order to keep the products stored in the refrigerated display case at a desired temperature, it is often necessary to operate the fan at low speeds due to the small internal volume of the refrigerated display case. Furthermore, frost can accumulate on various components of the refrigerated display case. Accumulation of frost interferes with heat transfer and reduces an efficiency of the refrigerated display case. It is thus periodically necessary to temporarily raise an internal temperature of the refrigerated display case in an effort to defrost the refrigerated display case. Periodically raising of the temperature inside the refrigerated display cases and the associated defrosting is often referred to as a defrost cycle. A length of the defrost cycle is a factor for maintaining the products stored in the refrigerated display case at a desired temperature.

SUMMARY

In one aspect, the present disclosure relates to a refrigeration system. The refrigeration system includes a first circulation fan electrically coupled to a power source via a first load wire. A relay is electrically coupled to the first circulation fan via a second load wire and to the power source. The relay includes a lead that is electrically coupled to a controller. In an open position, the relay interrupts electrical voltage from the relay to the first circulation fan via the second load wire such that electrical voltage is provided to the first circulation fan via the first load wire causing the first circulation fan to operate in a low-speed mode. In a closed position, the relay supplies electrical voltage to the first circulation fan via the second load wire such that electrical voltage is provided to the first circulation fan via the first load wire and the second load wire causing the first circulation fan to operate in a high-speed mode. Operation of the first circulation fan in the high-speed mode reduces a defrost cycle time associated with the refrigeration system relative to operation of the first circulation fan in low-speed mode.

In another aspect, the present disclosure relates to a method of reducing defrost cycle time in a refrigeration system. The method includes supplying electrical voltage to a circulation fan via a first load wire, thereby causing the circulation fan to operate in a low-speed mode. Electrical voltage is supplied to a relay via a controller. Responsive to a change in the voltage supplied to the relay via the controller, the relay is closed to supply electrical voltage to the circulation fan via a second load wire, thereby causing the circulation fan to operate in a high-speed mode. A defrost cycle time is reduced by operating the circulation fan in the high-speed mode relative to operation of the first circulation fan in low-speed mode.

In another aspect, the present disclosure relates to a display case. The display case includes a first circulation fan electrically coupled to a power source via a first load wire. A relay is electrically coupled to the first circulation fan via a second load wire and to the power source. The relay includes a lead that is electrically coupled to a controller. The relay is in a closed position when electrical voltage through the lead is interrupted. In an open position, the relay interrupts electrical voltage from the relay to the first circulation fan via the second load wire such that electrical voltage is provided to the first circulation fan via the first load wire, thereby causing the first circulation fan to operate in a low-speed mode. In the closed position, the relay supplies electrical voltage to the first circulation fan via the second load wire such that electrical voltage is provided to the first circulation fan via the first load wire and the second load wire, thereby causing the first circulation fan to operate in a high-speed mode.

BRIEF DESCRIPTION OF THE DRAWINGS

For a more complete understanding of the present disclosure and for further objects and advantages thereof, reference may now be had to the following description taken in conjunction with the accompanying drawings in which.

DETAILED DESCRIPTION

Various embodiments of the present disclosure will now be described more fully with reference to the accompanying drawings. The disclosure may, however, be embodied in many different forms and should not be construed as limited to the embodiments set forth herein.

Figure 1:
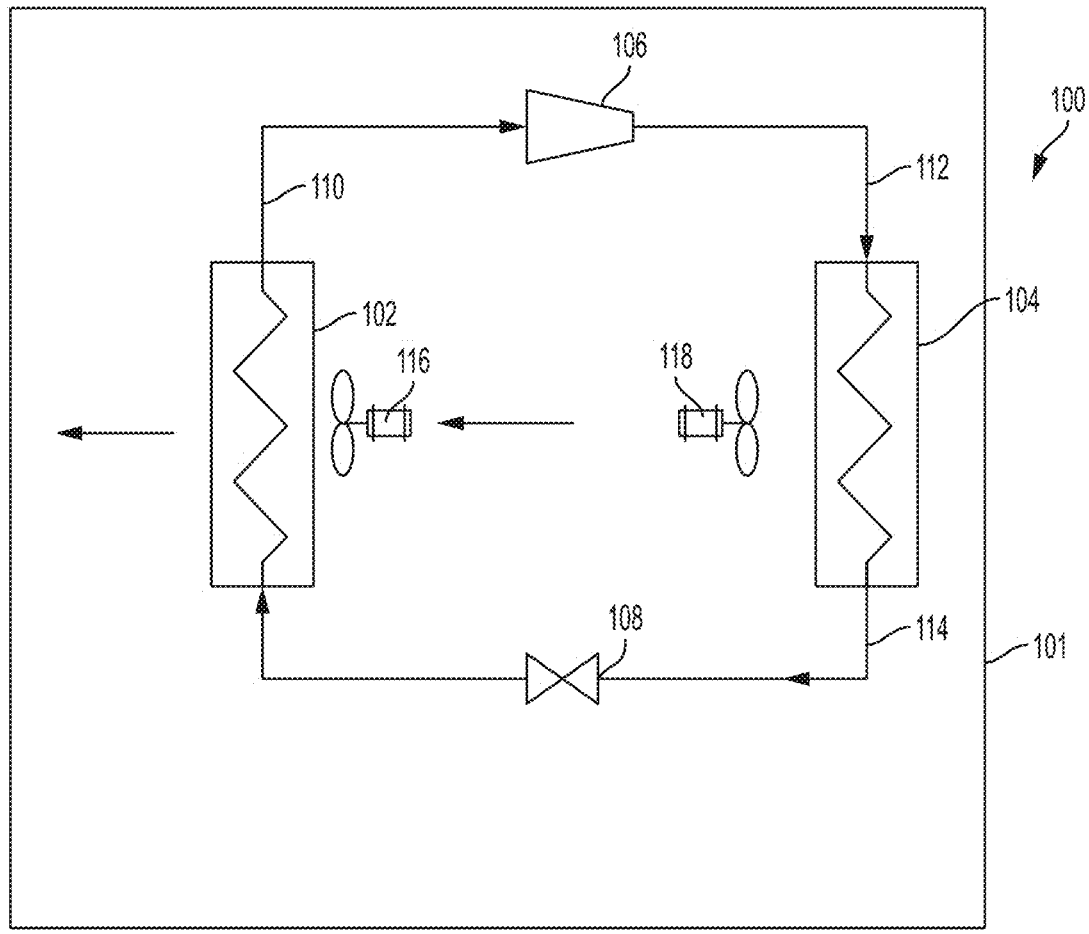
FIG. 1 is a schematic diagram of an illustrative refrigeration system.

FIG. 1 is a schematic diagram of an illustrative refrigeration system 100. The refrigeration system 100 includes a display case 101, a refrigerant evaporator coil 102, a condenser coil 104, a compressor 106, and a metering device 108. In a typical embodiment, the metering device 108 is, for example, a thermostatic expansion valve or a throttling valve. In various embodiments, the compressor 106 is a single-stage compressor, a multi-stage compressor, or any other type of compressor as dictated by design requirements. The refrigerant evaporator coil 102 is fluidly coupled to the compressor 106 via a suction line 110. The compressor 106 is fluidly coupled to the condenser coil 104 via a discharge line 112. The condenser coil 104 is fluidly coupled to the metering device 108 via a liquid line 114.

Still referring to FIG. 1, during operation, low-pressure, low-temperature refrigerant is circulated through the refrigerant evaporator coil 102. The refrigerant is initially in a liquid/vapor state. In a typical embodiment, the refrigerant is, for example, R-22, R-134a, R-410A, R-744, or any other suitable type of refrigerant as dictated by design requirements. Air from within the display case 101, which is typically warmer than the refrigerant, is circulated around the refrigerant evaporator coil 102 by a circulation fan 116. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the compressor 106 via the suction line 110. In a typical embodiment, the compressor 106 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. After leaving the compressor 106, the high-pressure, high-temperature, superheated vapor refrigerant travels through the discharge line 112 and enters the condenser coil 104.

Outside air is circulated around the condenser coil 104 by a condenser fan 118. The outside air is typically cooler than the high-pressure, high-temperature, superheated vapor refrigerant present in the condenser coil 104. Thus, heat is transferred from the high-pressure, high-temperature, super-heated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 104 via the liquid line 114 and enters the metering device 108.

In the metering device 108, the pressure of the high-pressure, high-temperature, sub-cooled liquid refrigerant is abruptly reduced. In various embodiments where the metering device 108 is, for example, a thermostatic expansion valve, the metering device 108 reduces the pressure of the high-pressure, high-temperature, sub-cooled liquid refrigerant by regulating an amount of refrigerant that travels to the refrigerant evaporator coil 102. Abrupt reduction of the pressure of the high-pressure, high-temperature, sub-cooled liquid refrigerant causes rapid evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the display case 101. The liquid/vapor refrigerant mixture leaves the metering device 108 and returns to the refrigerant evaporator coil 102.

Still referring to FIG. 1, during operation, outside air, which is typically at a higher relative humidity and temperature than air inside the display case 101, will enter the display case 101, for example, each time a door to the display case 101 is opened. Moisture present in the outside air often freezes on an external surface of the refrigerant evaporator coil 102 causing an accumulation of frost on the refrigerant evaporator coil 102 and on other internal structures of the display case 101. Accumulation of frost on the refrigerant evaporator coil 102 interferes with heat transfer between the refrigerant evaporator coil 102 and the air inside the display case 101 thereby reducing the efficiency of the refrigeration system 100. As a result of this phenomenon, it is necessary to periodically defrost the refrigerant evaporator coil 102. Defrosting of the display case 101 is typically accomplished by allowing the internal temperature of the display case 101 to rise for a period of time known as a defrost cycle. During a defrost cycle, a refrigerant solenoid valve is closed thereby preventing circulation of refrigerant. The circulation fan 116 remains active and continues to circulate outside air over the refrigerant evaporator coil 102 thereby facilitating defrosting of the frost that accumulated on refrigerant evaporator coil 102. During normal operation, also known as a cooling cycle, the circulation fan 116 is typically operated at a low speed. It has been found, however, that operating the circulation fan 116 at low speed during a defrost cycle results in longer defrost cycle times. Longer defrost cycle times causes the temperature of products stored in the display case 101 to rise for a prolonged period of time. In a typical embodiment, the increase in temperature of products within the display case 101 is mitigated by operating the circulation fan 116 at a higher speed. Utilizing a higher fan speed during the defrost cycle shortens the defrost cycle time and prevents unacceptable increase in temperature of products within the display case 101.

Figure 2:
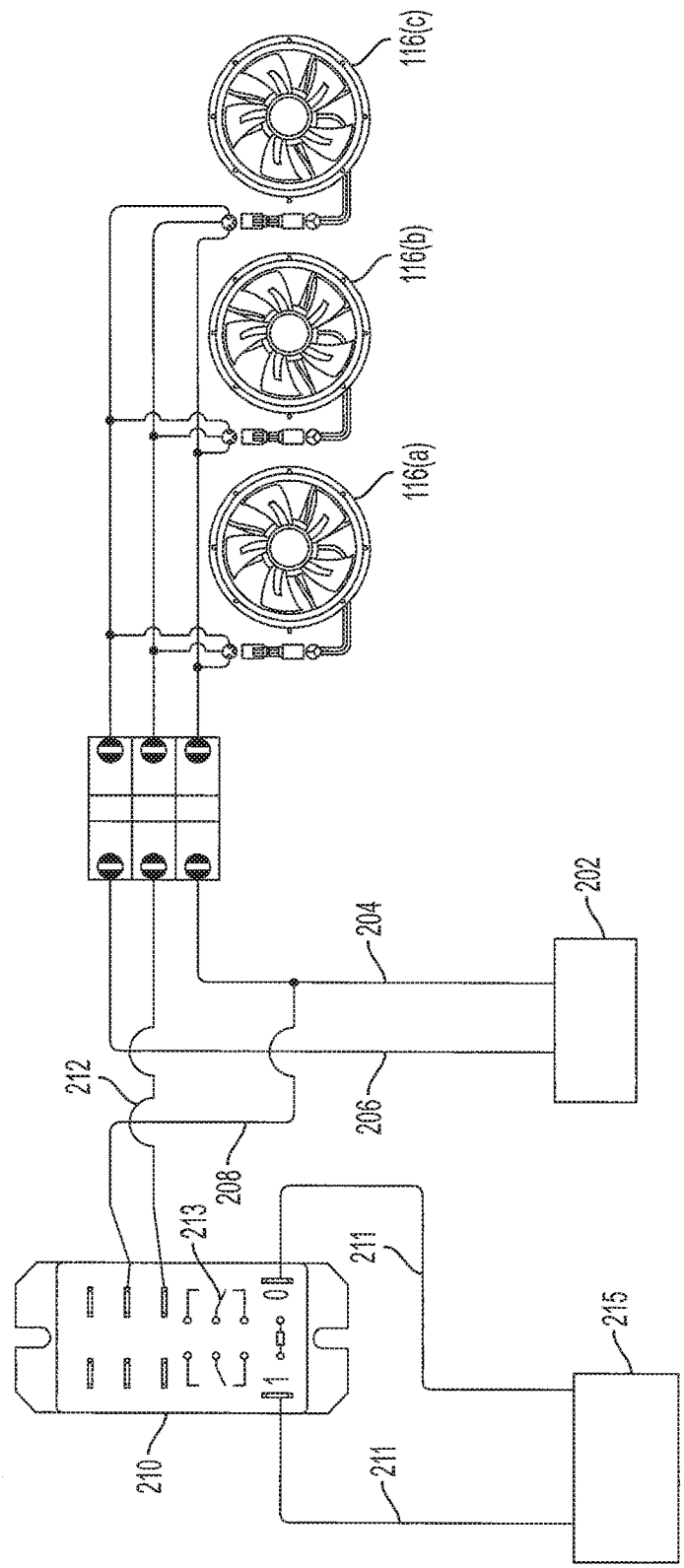
FIG. 2 is a wiring diagram of an illustrative refrigeration fan system.

FIG. 2 is a wiring diagram of an illustrative circulation fan 116. For purposes of illustration, FIG. 2 will be described herein relative to FIG. 1. In a typical embodiment, the circulation fan 116 is a dual-speed fan. By way of example, FIG. 2 illustrates a display case having a first circulation fan 116(*a*), a second circulation fan 116(*b*), and a third circulation fan 116(*c*); however, one skilled in the art will recognize that the display 101 could include any number of circulation fans as dictated by design requirements. A power source 202 is connected to a first load wire 204 and a neutral wire 206. The neutral wire 206 is connected to a neutral terminal of the circulation fan 116. The first load wire 204 is connected to a low-speed load terminal of the circulation fan 116. A relay wire 208 electrically connects the first load wire 204 to a relay coil 210. The relay coil 210 includes leads 211 that are electrically coupled a controller 215. The controller 215 directs the relay coil 210, via the leads 211, to close when the display case 101 enters a defrost cycle. In a typical embodiment, the relay coil 210 is biased in a closed position. That is, when the leads 211 of the relay coil 210 are not energized, a switching element 213 is biased to a closed position so as to electrically connect the relay wire 208 to a second load wire 212. The second load wire 212 is connected to a high-speed terminal of the circulation fan 116. When an electrical voltage is applied to the leads 211 of the relay coil 210, the switching element 213 moves to an open position so as to disconnect the relay wire 208 from the second load wire 212. The relay coil 210 has been described by way of example as being biased towards a closed position. However, one skilled in the art will recognize that the relay coil 210 could be biased in an open position such that application of electrical voltage to the leads 211 causes the relay coil 210 to move to the closed position.

Still referring to FIG. 2, when an electrical voltage is applied to the low-speed terminal and the high-speed terminal of the circulation fan 116 via the first load wire 204 and the second load wire 212, respectively, the circulation fan 116 operates in a high-speed mode. When electrical voltage is applied to the low-speed terminal of the circulation fan 116 via the first load wire 204 only, and no electrical voltage is applied to the high-speed terminal of the circulation fan 116 via the second load wire 212, the circulation fan 116 operates in a low-speed mode. Although the low-speed mode and the high-speed mode have been described herein as utilizing fan speeds of approximately 1200 rpm and approximately 2200 rpm, respectively, one of skill in the art will recognize that any appropriate fan speed could be utilized as dictated by design requirements provided that a speed of the circulation fan 116 operating in the high-speed mode is higher than a speed of the circulation fan 116 operating in the low-speed mode.

Still referring to FIG. 2, during cooling cycle operation, the controller 215 applies an electrical voltage to the leads 211 of the relay coil 210. Application of electrical voltage to the leads 211 of the relay coil 210 causes the switching element 213 of the relay coil 210 to move to the open position. When the switching element 213 is in the open position, no electrical current flows from the relay wire 208 to the second load wire 212. Thus, electrical voltage is applied only to the low-speed terminal of the circulation fan 116 via the first load wire 204. As such, the circulation fan 116 operates in the low-speed mode at a speed of, for example, approximately 1200 rpm during cooling cycle operation.

During defrost cycle operation, the controller 215 signals the relay coil 210, via the leads 211 to move to the closed position. In the case of the relay coil being biased to the closed position, such a signal could be interruption of electrical voltage to the leads 211 by the controller 215. With no electrical voltage applied to the leads 211, the switching element 213 of the relay coil 210 is biased to the closed position thereby electrically connecting the relay wire 208 and the second load wire 212. The relay coil 210 has been described by way of example as being biased towards a closed position. However, one skilled in the art will recognize that the relay coil 210 could be biased in an open position such that application of electrical voltage to the leads 211 causes the relay coil 210 to move to the closed position. Electrical connection of the relay wire 208 to the second load wire 212 causes electrical voltage to be delivered to the low-speed terminal and the high-speed terminal of the circulation fan 116 via the first load wire 204 and the second load wire 212, respectively. Delivery of electrical voltage to the low-speed terminal and the high-speed terminal of the fan 116 via the first load wire 204 and the second load wire 212, respectively, causes the circulation fan 116 to operate in the high-speed mode at a speed of, for example, approximately 2200 rpm. In addition to initiation of the defrost cycle, the controller 215 could, in various embodiments, signal the relay coil 210 to move to the closed position, for example, when a door to the display case 101 is opened. Thus, the circulation fan 116 operates at high speed when the door to the display case 101 is opened and the circulation fan 116 operates at low speed when the door to the display case 101 is closed. In still other embodiments, the controller 215 could signal the relay coil 210 to close, for example, responsive to a night curtain associated with the display case 101 opening. Thus, the circulation fan 116 operates at high speed when the night curtain is open and the circulation fan 116 operates at low speed when the night curtain is closed.

Figure 3:
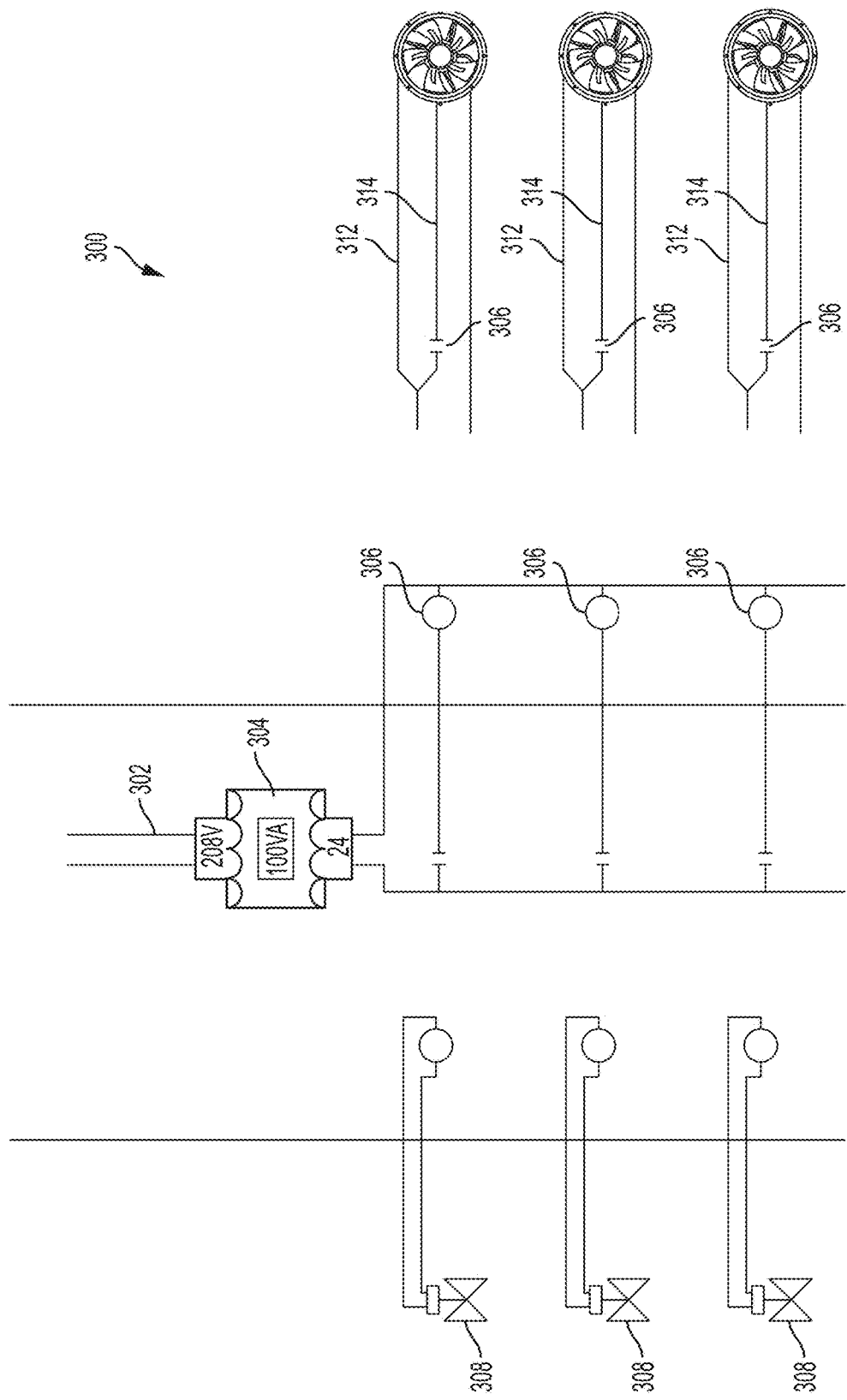
FIG. 3 is a wiring diagram of an illustrative retrofit assembly for the refrigeration fan system.

FIG. 3 is a wiring diagram of an illustrative retrofit assembly 302 for a refrigeration fan system 300. For purposes of illustration, FIG. 3 is discussed herein relative to FIG. 1. The retrofit assembly 302 includes a transformer 304. In a typical embodiment, the transformer 304 steps down an input voltage of, for example, approximately 200V to a working voltage of, for example, approximately 24V. Such a step down in voltage ensures that the retrofit assembly 302 can be safely installed by an assembly technician without the need for a licensed electrician. The transformer 304 is electrically coupled to a relay coil 306. During installation, the relay coil 306 is electrically coupled to the controller 215 such that, during a defrost cycle, the relay coil 306 closes so as to provide electrical voltage a low-speed terminal and a high-speed terminal to a fan 310 via a first load wire 312 and a second load wire 314, respectively as described above with respect to FIG. 2.

Figure 4A:
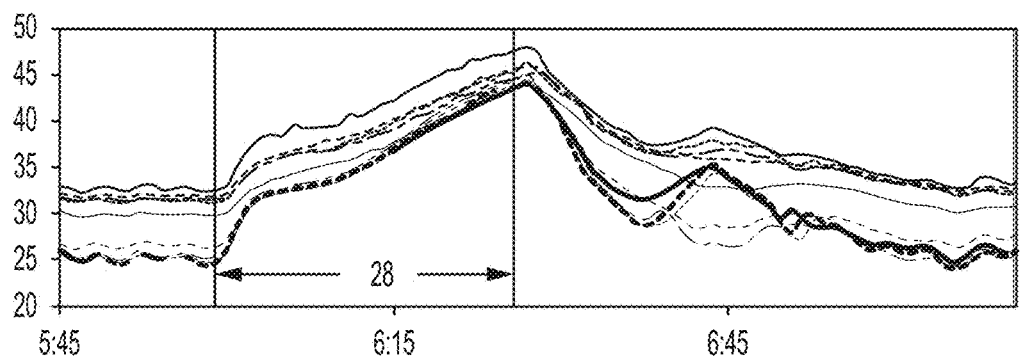
FIG. 4A is a graph of discharge air temperature over time when utilizing a circulation fan at high speed.
Figure 4B:
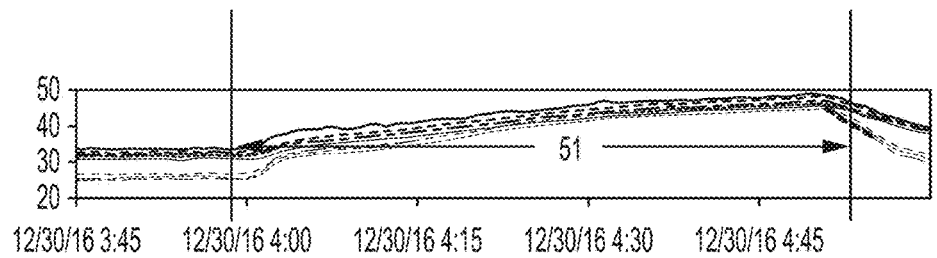
FIG. 4B is a graph of discharge air temperature over time when utilizing a circulation fan at low speed.

FIG. 4A is a graph of discharge air temperature over time when utilizing a circulation fan at high speed. FIG. 4B is a graph of discharge air temperature over time when utilizing a circulation fan at low speed. For purposes of illustration, FIGS. 4A-4B will be described herein relative to FIG. 1. As shown in FIG. 4A, when the circulation fan 116 operates in high-speed mode at a speed of, for example, approximately 2200 rpm, a defrost cycle time is approximately 28 minutes. During the defrost cycle time, the discharge air temperature rises above approximately 45° F. for approximately 6 minutes. By way of comparison, as shown in FIG. 4B, when the circulation fan 116 operates in low-speed mode at a speed of, for example, approximately 1200 rpm, the defrost cycle time is approximately 51 minutes. When the circulation fan 116 is operating in low-speed mode at a speed of, for example, approximately 1200 rpm, the discharge air temperature rises above approximately 45° F. for approximately 20 minutes. As such, use of the circulation fan 116 in high-speed mode causes the discharge air temperature to rise over a shorter period of time than when the circulation fan is utilized in low-speed mode. As a result, a product temperature of products stored in the display case 101 remains at an acceptable temperature.

Figure 4C:
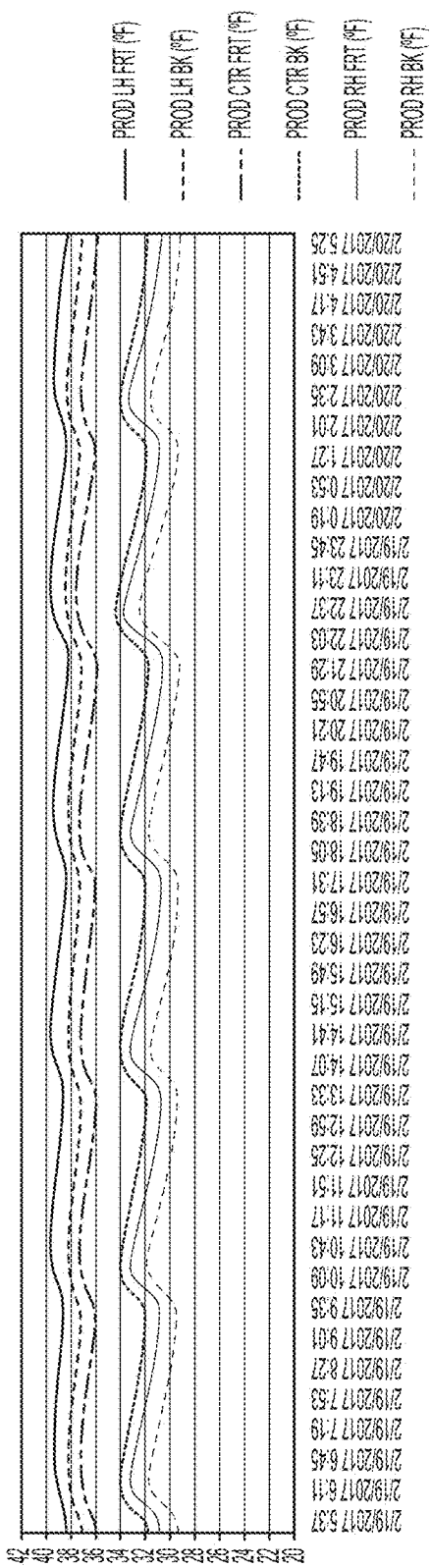
FIG. 4C is a graph of product temperature versus time when utilizing a circulation fan at low speed.
Figure 4D:
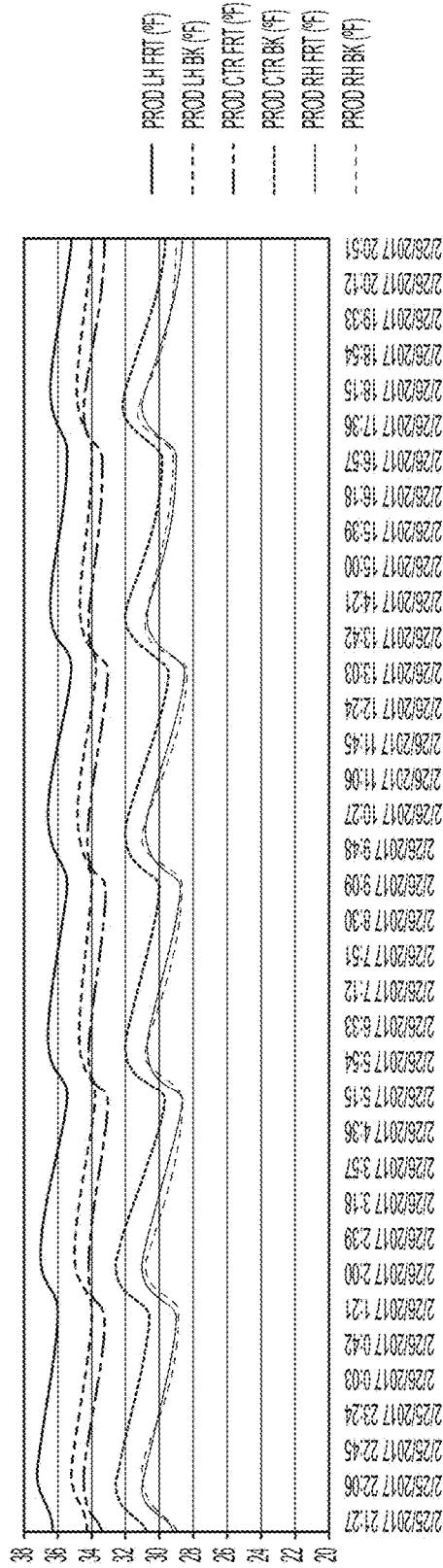
FIG. 4D is a graph of product temperature versus time when utilizing a circulation fan at high speed.

FIG. 4C is a graph of product temperature versus time when utilizing a circulation fan at low speed. FIG. 4D is a graph of product temperature versus time when utilizing a circulation fan at high speed. For purposes of illustration, FIGS. 4C-4D are described herein relative to FIG. 1. As shown in FIG. 4C, when the circulation fan operates at low-speed, the product in the display case 101 reaches a maximum temperature of approximately 40° F. However, as illustrated in FIG. 4D, when the circulation fan operates at high speed, the product in the display case 101 reaches a maximum temperature of approximately 38° F.

Figure 5:
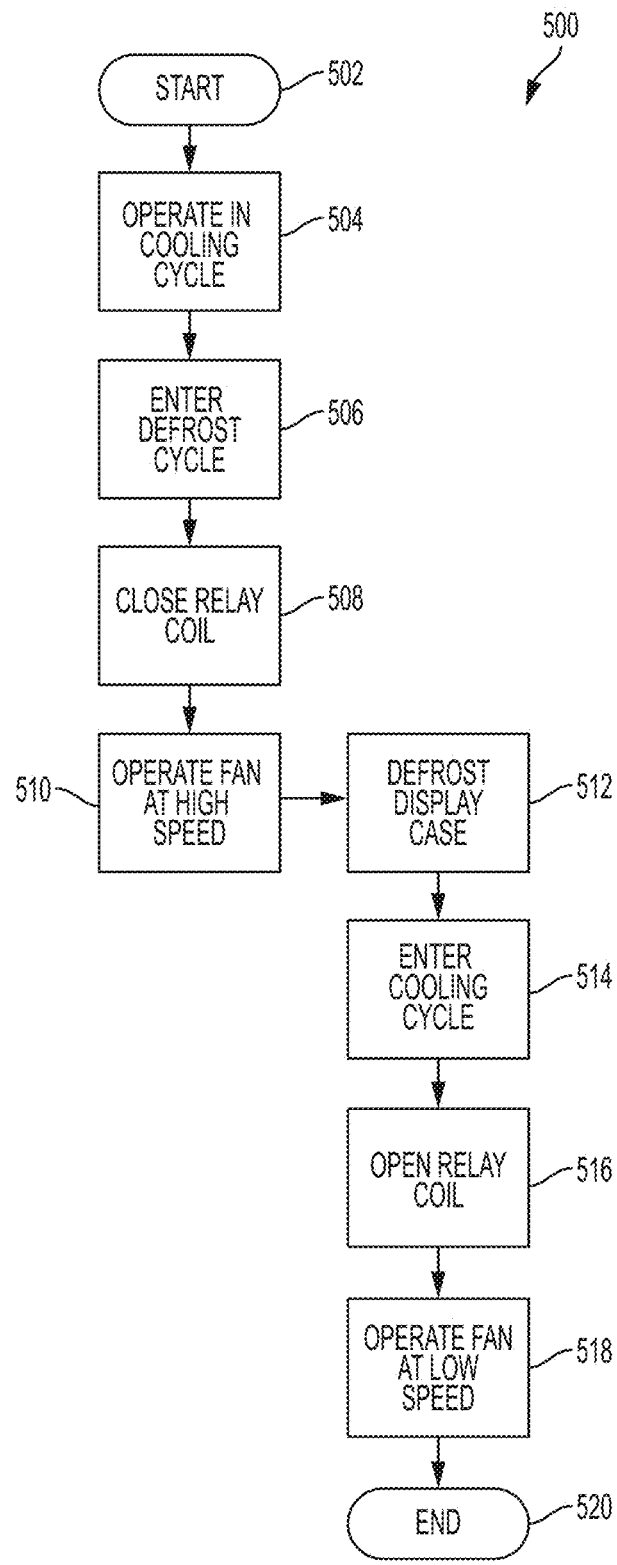
FIG. 5 is a flow diagram of an illustrative process for reducing defrost cycle time in a display case.

FIG. 5 is a flow diagram of an illustrative process 500 for reducing defrost time in a display case 101. The process 500 begins at step 502. At step 504, the display case is operated in a cooling cycle. During the cooling cycle, electrical voltage is applied to the leads 211 of the relay coil 210 thereby causing the switching element 213 of the relay coil 210 to move to the open position and interrupt voltage to the second load wire 212. With voltage to the second load wire 212 interrupted, the circulation fan 116 operates in the low-speed mode at a speed of, for example, approximately 1200 rpm. During the cooling cycle, frost accumulates inside the display case 101 and particularly on a surface of the refrigerant evaporator coil 102. At step 506, the display case 101 enters a defrost cycle. At step 508, electrical voltage to the leads 211 of the relay coil 210 is interrupted thereby causing the switching element 213 of the relay coil 210 to be biased to the close closed position and supply voltage to the circulation fan 116 via the first load wire 204 and the second load wire 212. The relay coil 210 has been described by way of example as being biased towards a closed position. However, one skilled in the art will recognize that the relay coil 210 could be biased in an open position such that application of electrical voltage to the leads 211 causes the relay coil 210 to move to the closed position. At step 510, the circulation fan 116 is operated in the high-speed mode at a speed of, for example, 2200 rpm. At step 512, frost that has accumulated on the refrigerant evaporator coil 102 and other interior surfaces of the display case 101 is defrosted. In a typical embodiment, the defrost cycle lasts, for example, approximately 28 minutes. At step 514, the defrost cycle ends and the display case enters a subsequent cooling cycle. At step 516, electrical voltage is applied to the leads 211 of the relay coil 210 thereby causing the switching element 213 of the relay coil 210 to move to the open position and interrupt electrical voltage to the circulation fan 116 via the second load wire 212. At step 518, the circulation fan 116 operates in the low-speed mode at a speed of, for example, 1200 rpm. The process 500 ends at step 520.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A refrigeration system, comprising:
   a first circulation fan electrically coupled in a non-switchable manner to a power source via a first load wire;
   a relay electrically coupled to the first circulation fan via a second load wire and to the power source, the relay comprising a lead that is electrically coupled to a controller;
   responsive to the refrigeration system operating in a cooling cycle, the controller positions the relay in an open position such that the relay interrupts electrical voltage from the relay to the first circulation fan via the second load wire such that electrical voltage is provided to the first circulation fan via the first load wire causing the first circulation fan to operate in a low-speed mode;
   responsive to the refrigeration system operating in a defrost cycle, the controller positions the relay in a closed position, such that the relay supplies electrical voltage to the first circulation fan via the second load wire such that electrical voltage is provided to the first circulation fan via the first load wire and the second load wire causing the first circulation fan to operate in a high-speed mode; and
   wherein operation of the first circulation fan in the high-speed mode reduces a length of a time period where an increased discharge air temperature exists relative to operation of the first circulation fan in low-speed mode.

2. The refrigeration system of claim 1, wherein the controller signals the relay, via the lead, to close at a start of a defrost cycle.

3. The refrigeration system of claim 1, wherein the first load wire is electrically coupled to a low-speed terminal of the circulation fan and the second load wire is electrically coupled to a high-speed terminal of the circulation fan.

4. The refrigeration system of claim 1, comprising a second circulation fan electrically coupled to the power source and the relay in parallel with the first circulation fan.

5. The refrigeration system of claim 4, comprising a third circulation fan electrically coupled to the power source and the relay in parallel with the first circulation fan and the second circulation fan.

6. The refrigeration system of claim 1, wherein the relay is biased in the closed position.

7. The refrigeration system of claim 1, wherein the first circulation fan operates in high-speed mode responsive to the refrigeration system starting a defrost cycle.

8. The refrigeration system of claim 1, wherein a defrost cycle time is less than approximately 30 minutes when the first circulation fan operates in a high-speed mode.

9. The refrigeration system of claim 1, wherein, in the high-speed mode, the first circulation fan operates at a speed of approximately 2200 rpm.

10. The refrigeration system of claim 9, wherein, in the low-speed mode, the first circulation fan operates at a speed of approximately 1200 rpm.

11. A method of reducing defrost cycle time in a refrigeration system, the method comprising:
    supplying electrical voltage in a non-switchable manner to a circulation fan via a first load wire, thereby causing the circulation fan to operate in a low-speed mode;
    supplying electrical voltage to a relay via a controller;
    responsive to the refrigeration system operating in a defrost cycle, closing the relay to supply electrical voltage to the circulation fan via a second load wire, thereby causing the circulation fan to operate in a high-speed mode; and operating the circulation fan to reduce a length of a time period where an increased discharge air temperature exists relative to operation of the circulation fan in low-speed mode.

12. The method of claim 11, wherein the controller signals the relay to close responsive to a refrigeration system entering a defrost cycle.

13. The method of claim 11, comprising operating the circulation fan in high-speed mode responsive to the refrigeration system starting a defrost cycle.

14. The method of claim 11, wherein a defrost cycle time is less than approximately 30 minutes when the circulation fan operates in a high-speed mode.

15. The method of claim 11, comprising opening the relay responsive to the refrigeration system entering a cooling cycle.

16. A display case comprising:
a first circulation fan electrically coupled to a power source in a non-switchable manner via a first load wire, the first circulation fan circulating air over an evaporator coil and into the display case;

a relay electrically coupled to the first circulation fan via a second load wire and to the power source, the relay comprising a lead that is electrically coupled to a controller, the relay being in an closed position when electrical voltage through the lead is interrupted;

in an open position, the relay interrupts electrical voltage from the relay to the first circulation fan via the second load wire such that electrical voltage is provided to the first circulation fan via the first load wire, thereby causing the first circulation fan to operate in a low-speed mode;

in the closed position, the relay supplies electrical voltage to the first circulation fan via the second load wire such that electrical voltage is provided to the first circulation fan via the first load wire and the second load wire, thereby causing the first circulation fan to operate in a high-speed mode; and wherein the controller positions the relay in the closed position, thereby causing the first circulation fan to operate in the high-speed mode, responsive to a door of the display case opening.

* * * * *